United States Patent [19]

Butterworth et al.

[11] 3,919,415

[45] Nov. 11, 1975

[54] SUBSTANCE MM 4550 AND PROCESS FOR PRODUCING SAME

[75] Inventors: Denis Butterworth, Redhill; George Newbolt Rolinson, Newdigate, both of England

[73] Assignee: Beecham Group Limited, England

[22] Filed: Sept. 10, 1971

[21] Appl. No.: 179,279

[30] Foreign Application Priority Data
Sept. 17, 1970 United Kingdom............ 44365/70
Sept. 17, 1970 United Kingdom............ 44366/70

[52] U.S. Cl............. 424/115; 195/80 R; 424/246; 424/271
[51] Int. Cl............................................ A61k 21/00
[58] Field of Search................... 424/115; 195/80

[56] References Cited
OTHER PUBLICATIONS
Miller, The Pfizer Handbook of Microbial Metabolites, McGraw-Hill Book Co., Inc., N.Y., N.Y., 1961, pp. 266, 358 and 457.

*Primary Examiner*—Jerome D. Goldberg

[57] ABSTRACT

MM 4550 and non-toxic solids thereof are obtained by cultivating a substance MM 4550 producing strain of Streptomyces olivaceus, or a mutant strain thereof, in a nutrient medium containing assimilable sources of carbon, nitrogen and mineral salts, and thereafter recovering substance MM 4550 from the mixture. Substance MM 4550 and non-toxic salts thereof, including particularly the barium salt thereof, exhibit activity against $\beta$-lactamase enzymes.

A synergistic combination is also produced comprising a mixture of substance MM 4550 or a non-toxic salt thereof, and a member selected from the group consisting of penicillin, a non-toxic salt thereof, and cephalosporin and a non-toxic salt thereof. Such synergistic combinations exhibit antibacterial activity of an enhanced level.

3 Claims, 1 Drawing Figure

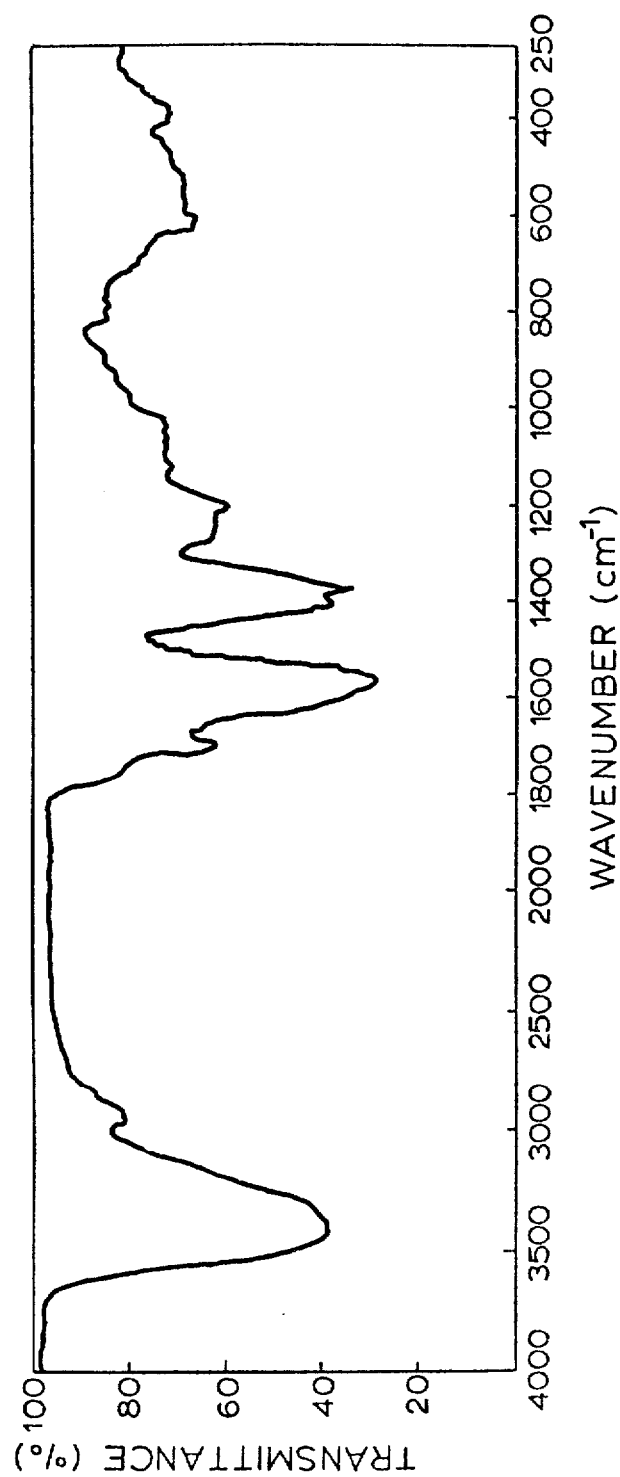

SUBSTANCE MM4550 AND PROCESS FOR PRODUCING SAME

This invention relates to a new biosynthetic substance, designated substance MM 4550, and to methods for the production thereof.

Accordingly the present invention provides substance MM 4550, and non-toxic salts thereof which substance is an acidic solid with no characteristic ultraviolet spectrum, in the form of its barium salt it has the infra-red absorption spectrum shown in the accompanying drawing, and it inhibits the penicillin-degrading and cephalosporin-degrading action of β-lactamase enzymes.

The invention also provides a process for preparing substance MM 4550, which process comprises cultivating a substance MM 4550 producing strain of *Streptomyces olivaceus* or a mutant strain thereof in a nutrient medium containing assimilable sources of carbon, nitrogen and mineral salts, and thereafter recovering substance MM 4550 from the mixture. Preferably *Streptomyces olivaceus* ATCC 21379, 21380, 21381 and 21382 are used. These strains were obtained from various soil samples and have been identified as *Streptomyces olivaceus*; they have also been recorded as BRL 923, 925, 927 and 929 in the collection at Beecham Research Laboratories, Brockham Park, Betchworth, Great Britain.

Preferably the cultivation is carried out aerobically at 20° to 35°C, especially at 30° to 31°C, in a nutrient medium at approximately pH 7. Suitably the cultivation is carried out for up to 7 days, especially for about 2 days. Substance MM4550 may be recovered from the medium by ion-exchange methods, chromatography, gel filtration and similar methods.

The four strains deposited as ATCC 21379–21382 were examined in various media for growth characteristics, melanin production, spore morphology and physiology tests such as starch hydrolysis, gelatin liquefaction, nitrate reduction. As a result, they were identified as *Streptomyces olivaceus*. In practice substance MM 4550 may be produced by first growing the culture of microorganism to be used on a suitable nutrient medium to allow sporulation. A yeast extract-glucose agar is particularly suitable for species of *Streptomyces olivaceus* and after inoculation the culture is incubated at 28°C for 1 to 2 weeks. The spores are then washed off the medium with sterile water and this spore suspension is then used to inoculate an aqueous nutrient medium in which the organism grows and produces substance MM 4550. Such a growth may be used to inoculate a second batch of liquid culture medium for the production of MM 4550.

The fermentation medium should contain sources of assimilable carbon and assimilable nitrogen together with inorganic salts. Suitable sources of nitrogen include yeast extract, soyabean flour, meat extract, cottonseed flour, malt distillers dried solubles, single amino acids, protein hydrolysates and ammonium and nitrate nitrogen. Suitable carbon sources include glucose, lactose, maltose, starch and glycerol. Improved yields or substance MM 4550 are obtainable by the inclusion in the medium of various metallic salts, for example salts of manganese or cobalt, and by the addition of chalk.

After a fermentation time of up to 7 days the fermentation medium is harvested and the product, substance MM 4550, is then extracted from the fermentation medium. The fermentation may also be carried out by continuous flow methods.

The active product, MM 4550, is found to be present mainly in the culture fluid, very little being retained in the microbial cells. After separation of the mycelium from the liquor at the end of the cultivation period, for example, by filtration, a substantial degree of purification of the substance MM 4550 can be achieved by contacting the liquor with an anion exchange material, for example an ion exchange cellulose, and then eluting the absorbed substance MM 4550 therefrom. The solution so obtained may be desalted by further ion-exchange processes. Alternatively, initial purification of the liquor may be effected by chromatographic separation on a cellulose column or on a column of a cation-exchange material such as Amberlite CG50 through which the substance MM4550 passes faster than the impurities. Some degree of purification of the culture filtrate may also be effected by gel filtration on "Sephadex G15" or "G25".

After processing by one or more of the above procedures, the resulting aqueous purified fraction may be freeze-dried to yield a solid preparation of substance MM 4550. This preparation and clarified culture broths) may be purified by various extraction methods. The active substance MM 4550 is fairly stable in clarified fermentation brew at acid and neutral pH. In partially purified aqueous fractions stability is much lower and moreover some degradation occurs during evaporation at reduced pressure or on freeze-drying. As a result, the solid preparations obtained are contaminated with degradation products of the active substance. Stability during processing is, however, improved by addition of borate.

Gel filtration characteristics of substance MM 4550 and its ability to pass through a dialysis membrane indicate that the substance has a fairly low molecular weight. Substance MM 4550 on electrophoresis migrates a distance of 18 cm towards the anode on Whatman 3MM paper 40 cm. in length with Cellophane covered paper wicks of total 10 cm. length, with an applied voltage of 3000 for 25 minutes (approx. 60 volts/cm.) with pyridine-acetic acid buffer at pH 5.3. Composition of buffer: 0.067M acetic acid adjusted to pH 5.3 with pyridine. With thin layer chromatography on cellulose chromatogram sheets, developed with acetone/pyridine-acetate buffer (electrophoresis buffer) (2:1) MM4550 has an $R_F$ value of approx. 0.85.

The position of substance MM4550 on chromatograms or electropherograms may be determined by bioautography or by spraying with Ehrlich's reagent (300 mg.4-dimethylaminobenzaldehyde dissolved in 9 ml. concentrated HCl + 9 ml. ethanol + 54 ml. n-butanol). Substance MM4550 reacts to give a blue colour. Substance MM 4550 can be detected and measured in fermentation brews and during isolation by means of an agar plate diffusion assay. Molten nutrient agar at 45°C is seeded with a suitable β-lactamase producing strain of *Klebsiella aerogenes* and then mixed with a sufficient quantity of a sterile solution of penicillin G to give a concentration of penicillin G in the agar of 10 μg./ml. The agar is then poured into a petri-dish and, after solidification, equally spaced cylindrical wells are made in the layer of agar by using a sterile metal cutter. The solutions to be tested are introduced into the wells. The plate is then incubated at a constant temperature between 27°C amd 37°C. During the period of incubation any substance MM 4550 in the test solution diffuses out from the well into the agar and there inhibits the action of β-lactamase introduced into the agar with the Klebsiella cells. The penicillin G is thus protected from destruction by β-lactamase and is present in sufficient concentration to prevent growth of Klebsiella. In parts of the agar to which MM 4550 has not diffused in sufficient concentration the penicillin G is destroyed by β-lactamase, allowing dense growth of the Klebsiella to develop. Clear circular zones of inhibition of Klebsiella growth are thus formed around the wells containing substance MM 4550, the size of each zone depending on the concentration of substance MM 4550 in the solution under test.

Alternatively, the amount of substance MM 4550 in a solution can be estimated by determining the degree of inhibition of the rate of β-lactamase hydrolysis of penicillin G, the initial reaction velocity being measured in the presence and absence of the material under test. The rate of hydrolysis of penicillin G is determined by microiodo-metric assay of the penicilloic acid formed.

The broad spectrum of activity of substance MM 4550 against various clinically important β-lactamase-sis illustrated in Table 1, which shows for each enzyme preparation the percentage inhibition of the rate of penicillin G hydrolysis caused by the inclusion of substance MM 4550 in the enzyme reaction mixture. The amounts of the enzymes in the reaction mixtures were such as to hydrolyse penicillin G at a rate of 0.1–0.2 μg./ml./min. under the conditions of the experiment. The enzyme preparations were incubated at 37°C with 10 μg./ml. penicillin G at pH 7.0 (M/20 phosphate buffer) both in the absence of substance MM 4550 and also with MM 4550 present at 1:625 dilution of clarified fermentation brew.

Table 1

| Inhibition of reaction velocity over initial period of 10 minutes | |
|---|---|
| Source of β-lactamase | per cent Inhibition |
| Escherichia coli strain B11 | 86 |
| Escherichia coli strain HS | 23 |
| Klebsiella aerogenes strain A1 | 83 |
| Proteus vulgaris strain A | 51 |
| Pseudomonas pyocyanea strain A | 13 |
| Bacillus cereus strain B569/H | 68 |
| Staphylococcus pyogenes strain A | 0 |
| Staphylococcus pyogenes strain H | 18 |

In each case, the inhibition is of a progressive nature, increasing with time of contact of enzyme with inhibitor, as illustrated in Table 2, in which is shown the percentage inhibition of the initial reaction velocity (hydrolysis of penicillin G) after pre-incubation of the enzyme with the inhibitor for increasing periods of time.

Table 2

| Progressive inhibition of β-lactamases by MM 4550 (per cent) | | | | |
|---|---|---|---|---|
| Source of β-lactamase | Pre-incubation Period (mins.) | | | |
| | 0 | 30 | 60 | 120 |
| Escherichia coli strain B11 | 19 | 92 | 92 | — |
| Escherichia coli strain HS | 21 | 43 | 44 | — |
| Klebsiella aerogenes strain A1 | 9 | 36 | 39 | — |
| Proteus vulgaris strain A | 0 | 12 | 12 | — |
| Bacillus cereus strain B569/H | 0 | 26 | 60 | 70 |
| Staphylococcus pyogenes strain A | 0 | 30 | 40 | 60 |

Table 2-continued

| Progressive inhibition of β-lactamases by MM 4550 (per cent) | | | | |
|---|---|---|---|---|
| Source of β-lactamase | Pre-incubation Period (mins.) | | | |
| | 0 | 30 | 60 | 120 |
| Staphylococcus pyogenes strain H | 0 | — | 20 | 30 |

It can be shown also that the inhibition is not reversed either by addition of excess substrate or by dialysis. The irreversible and progressive nature of the β-lactamase inhibition caused by low concentration of MM 4550 is novel, and different from that caused by certain penicillins. Separate tests have shown that MM 4550 is not a general enzyme poison. Substance MM 4550, as the more purified barium salt, has been found to have antibacterial properties in addition to its β-lactamase inhibiting properties. Crude preparations of substance MM 4550 have antibacterial activity but it is much weaker than that of the barium salt. Strains against which this activity was measured included Staphylococcus aureus Oxford and Klebsiella aerogenes.

We have found that there is antibacterial synergism between substance MM 4550 and penicillins or cephalosporins.

Accordingly the present invention provides an antibacterial composition comprising a penicillin or cephalosporin or a non-toxic salt thereof and substance MM 4550, together with a non-toxic pharmaceutically acceptable carrier.

The penicillin or cephalosporin may have Gram-positive or broad-spectrum activity or may already be fairly resistant to various β-lactamases produced by pathogenic bacteria.

The compositions contain the usual non-toxic pharmaceutically acceptable carriers, for example inert fillers, binders, lubricants etc. for tablets and paediatric syrups, and sterile water for parenteral preparations, or gelatin capsules.

Antibacterial synergism between substance MM 4550 and a penicillin is illustrated by the experimental data in the Table 1 which show the effects of substance MM 4550 on the minimum inhibitory concentrations of ampicillin against a number of strains of clinically important pathogenic bacteria:

Table 1

| | Minimum Inhibitory Concentration (μg./ml.) of ampicillin | |
|---|---|---|
| Bacterial Strain | Ampicillin alone | Ampicillin with substance MM4550* |
| Klebsiella aerogenes A | 100 | 2.5 |
| Klebsiella aerogenes E70 | 250 | 10.0 |
| Proteus mirabilis 8 | 1000 | 5.0 |
| Proteus mirabilis 11 | 1000 | 2.5 |
| Proteus mirabilis 889 | 1000 | 2.5 |
| Staphylococcus aureus Russell | 500 | 2.5 |
| Staphylococcus aureus H | 500 | 2.5 |
| Staphylococcus aureus 1517 | 1000 | 25 |

*The substance MM 4550 was present at a concentration of one-tenth of that in the active clarified fermentation brew used for the experiment. This fermentation brew showed no antibiotic activity when tested alone at the same concentration against the eight test bacteria.

Data illustrating antibacterial synergism between substance MM 4550 and a cephalosporin are given in Table 2 which shows the effects of substance. MM 4550 on the minimum inhibitory concentrations of cephaloridine against various β-lactamase-producing pathogenic bacteria.

Table 2

| Bacterial strain | Minimum Inhibitory Concentration (μg./ml.) of cephaloridine | |
|---|---|---|
| | Cephaloridine alone | Cephaloridine with MM 4550* |
| *Klebsiella aerogenes* T201 | 500 | 50 |
| *Klebsiella aerogenes* Oxy B | 12.5 | 2.5 |
| *Escherichia coli* B11 | 250 | 50 |
| *Escherichia coli* T506 | 12.5 | 5.0 |
| *Proteus vulgaris* D | 500 | 12.5 |
| *Proteus vulgaris* E | 500 | 5.0 |

*Same meaning as in Table 1.

THE FOLLOWING EXAMPLES ILLUSTRATE THE INVENTION:

EXAMPLE 1

*Streptomyces olivaceus* BRL 923, BRL 925 and BRL 929 (ATCC 21379 – 21382) were each grown for 7 days at 28°C on solid agar slants in 250 ml. medical flat bottles, the agar medium having the following composition:

| Constituent | Amount (g./l.) |
|---|---|
| Yeast Extract | 10.0 |
| Glucose | 10.0 |
| Agar | 15.0 |

The pH of the medium was adjusted to 6.8 before sterilization. A spore suspension of each of the three cultures was then prepared by washing the slant culture with 35 ml. of sterile water containing 0.02% "Tween 80". 0.5 ml. of each of these spore suspensions was used to inoculate 20 ml. quantities of sterile fermentation medium in 100 ml. conical flasks closed with gauze/cotton-wool pads. The composition of the fermentation medium was as follows:

| Constituent | Amount (g./l.) |
|---|---|
| Yeast extract | 4.0 |
| Glucose | 20.0 |
| Malt extract | 10.0 |

The pH of the medium was adjusted to 8.0 and the medium was then sterilized by autoclaving at 120°C for 15 minutes. After inoculation, the fermentation flasks were incubated at 28°C on a rotary shaker at 240 r.p.m. with a 32 mm. throw for 4 days. The fermentation brew from each flask was then clarified by centrifugation and the supernatants were assayed for substance MM 4550 activity by the agar plate diffusion assay as described above, and the results are set out in the following table:

| Culture | Diameter of Inhibition zone (mm) |
|---|---|
| BRL 923 | 17.0 |
| BRL 925 | 19.3 |
| BRL 929 | 20.9 |

EXAMPLE 2

A spore suspension of *Streptomyces olivaceus* BRL 923 (ATCC 21379) was prepared as described in Example 1 and used to inoculate 20 ml. amounts of fermentation medium in 100 ml. conical flasks closed with gauze/cotton wool pads. The composition of fermentation medium A was as follows:

| Constituent | Amount (g./l.) |
|---|---|
| L-arginine monohydrochloride | 2.5 |
| Lactose | 20.0 |
| $K_2HPO_4$ | 1.5 |
| NaCl | 3.0 |
| $MgSO_4.7H_2O$ | 1.0 |
| $Fe_2(SO_4)_3$ | 0.05 |
| $CuSO_4.5H_2O$ | 0.003 |
| $ZnSO_4.7H_2O$ | 0.003 |
| $MnSO_4.4H_2O$ | 0.002 |

The pH of the medium was adjusted to 7.0 before sterilization by autoclaving for 15 minutes at 15 lb./sq. inch. Media B, C and D were identical with medium A except for the substitution of the following nitrogen sources for L-arginine monohydrochloride:

Medium B — L-tyrosine
Medium C — sodium nitrate
Medium D — ammonium sulphate

After incubation for 4 days at 28°C on a rotary shaker at 240 r.p.m. with 32 mm. throw, clarified fermentation brew from each medium was assayed for substance MM 4550 activity by the agar plate diffusion method, with the following results:

| Medium | Diameter of Inhibition zone (mm.) |
|---|---|
| A | 22.1 |
| B | 21.6 |
| C | 13.7 |
| D | 12.9 |

EXAMPLE 3

A spore suspension of *Streptomyces olivaceus* BRL 923 (ATCC 21379) was prepared as described in Example 1 and used to inoculate 20 ml. amounts of sterile fermentation medium in 100 ml. conical flasks. The medium had the following composition:

| Constituent | Amount (g./l.) |
|---|---|
| L-tyrosine | 1.0 |
| Glucose | 1.0 |
| $K_2HPO_4$ | 2.0 |
| $Fe_2(SO_4)_3$ | 0.05 |
| $CuSO_4.5H_2O$ | 0.003 |
| $MnSO_4.4H_2O$ | 0.004 |

The pH of the medium was adjusted to 7.0 before sterilizing for 15 minutes at 15 lb./sq. inch. The flasks were then incubated at 28°C on a rotary shaker at 240 r.p.m. with 32 mm. throw. After incubation for periods of 20 hours, 44 hours and 68 hours, duplicate flasks were removed and the clarified brew from each assayed for substance MM 4550 activity by the agar plate diffusion method. The following results were obtained:

| Period of Incubation (hours) | Average zone diameter (mm.) |
|---|---|
| 20 | 15.6 |
| 44 | 28.0 |
| 68 | 30.5 |

EXAMPLE 4

Spores of *Streptomyces olivaceus* BRL 923 (ATCC 21379) were grown on yeast extract/glucose agar as described in Example 1. 50 ml. of sterile de-ionized water containing 0.02% Tween 80 was added to one Roux bottle slant culture and the spores suspended by shaking. This spore suspension was then added as inoculum to 75.1. of sterilized seed stage medium in a 100.1. stainless steel fermenter. The composition of the seed stage medium was as follows:

| Constituent | Amount (g./l.) |
| --- | --- |
| Soyabean flour | 10.0 |
| Glucose monohydrate | 20.0 |

To control foaming, 50 ml. of 10% $^v/v$ "Pluronic L81" in soya bean oil was added to the fermentation medium before sterilization. The medium was steam sterilized in the fermenter for 20 minutes at 120°C. The seed stage culture was stirred at 140 r.p.m. with a 7.5 inch diameter vaned disc agitator and supplied with 75 l./Min. sterile air through an open-ended spargar. The culture vessel was fitted with baffles. The temperature was controlled at 28°C and after incubation under these conditions for 45 hours, 2.5 l. of this seed culture was added an inoculum to 50 l. sterile fermentation medium in a 90 l. stainless steel fermenter. The fermentation medium had the following composition:

| Constituent | Amount(g./l.) |
| --- | --- |
| L-tyrosine | 1.0 |
| Glucose monohydrate | 1.0 |
| $K_2HPO_4$ | 2.0 |
| $Fe_2(SO_4)_3$ | 0.05 |
| $CuSO_4.5H_2O$ | 0.003 |
| $MnSO_4.4H_2O$ | 0.05 |

The pH of the medium was adjusted to 7.0 before sterilization, using a dilute solution of hydrochloric acid. To control foaming, 100 ml. of 10% $^v/v$ "Pluronic L81" in soya bean oil was added before sterilization. The medium was steam sterilized in the fermenter for 20 minutes at 120°C. The fermentation was stirred at 430 r.p.m. with a 5 inch diameter vaned disc agitator, the fermenter being provided with baffles. Sterile air was supplied through an open-ended sparger at the rate of 50 l./min. and the temperature was controlled at 30°C. Incubation under these conditions was continued for 48 hours. At various times during the fermentation samples of the culture were taken from the fermenter and, after clarification, assayed by the agar plate diffusion method, with the following results:

| Age of Culture (hours) | Diameter of Inhibition zone(mm.) |
| --- | --- |
| 6 | 0 |
| 12 | 14.9 |
| 24 | 23.5 |
| 36 | 24.5 |
| 48 | 26.7 |

The harvest fermentation brew was clarified by centrifugation and the clear supernatant was stored at 5°C. 300 ml. of the clarified brew was concentrated to 30 ml. in a rotary vacuum evaporator. The concentrate was loaded on to a 2 inch × 8ft. column of "Amberlite IRC50" cation exchange resin equilibrated with borate buffer (0.1% $^w/v$ $Na_2B_4O_7.10H_2O$, pH8). The column was eluted with borate buffer and the eluate collected in 25ml. fractions. The bulked active fractions, amounting to 250 ml, were concentrated to 20ml. using a rotary vacuum evaporator and then desalted on a 1 × 18 inch column of Amberlite XAD-1 resin. On elution with de-ionized water 10ml. fractions were collected and the active fractions were bulked to give 80 ml. solution which was freeze-dried to yield 56 mg. of white powder. The purification achieved was five-fold on an activity basis relative to the total dissolved solids in the harvest brew.

EXAMPLE 5

A fermentation using *Streptomyces olivaceus* BRL 923 (ATCC 21379) was carried out in an identical manner to that given in Example 4 except that the fermentation medium had the following composition:

| Constituent | Amount (g./l.) |
| --- | --- |
| Soyabean flour ("Arkasoy50") | 10.0 |
| Glucose monohydrate | 20.0 |
| $MnSO_4.4H_2O$ | 0.05 |

The fermentation was harvested after 48 hours and clarified by centrifugation. The clarified brew was assayed by the agar plate diffusion method and found to give a zone of inhibition of 28.6 mm. 10.1 of the clarified brew was stirred with 3 kg. wet weight of "Whatman DE 23" ion-exchange cellulose in the acetate form. The slurry was filtered and the substance MM 4550 eluted from the resin with 3 l. of 0.5 M sodium sulphate to give an extract of substance MM 4550 in 80% yield from the clarified harvest brew. This extract was concentrated to 80 ml. in a rotary vacuum evaporator when much of the sodium sulphate precipitated out. The concentrate was filtered and then passed through a 2 inch × 5 ft. column of Amberlite XAD-2 resin. The column was eluted with de-ionized water and the eluate collected in 20 ml. fractions. The bulked active fractions amounting to 500 ml. were concentrated to 30 ml. by ultrafiltration using a UM-05 Amicon membrane. The concentrate was then freeze-dried to yield 100 mg. of white powder which had a specific substance MM 4550 activity approximately 33 times that of the total dissolved solids in the clarified harvest brew.

EXAMPLE 6

A fermentation using *Streptomyces olivaceus* ATCC 21379 was carried out in an identical manner to that given in Example 4 except that the fermentation medium had the following composition:

| Constituent | Amount (g./l.) |
| --- | --- |
| Soyabean flour("Arkasoy"50) | 10.0 |
| Glucose monohydrate | 20.0 |
| Chalk(precipitated calcium carbonate) | 0.2 |
| Cobalt chloride($CoCl_2.6H_2O$) | 0.001 |

10% v/v "Pluronic L81" in soyabean oil 300 ml.) was added to prevent foaming. The fermentation was harvested after 48 hours and clarified by centrifugation. The clarified brew was assayed by the agar plate diffusion method and gave a zone of inhibition of 33.0 mm. 100 l. of the clarified brew was stirred with 12 Kg. wet weight of "Whatman DE 32" ion exchange cellulose in the acetate form. The slurry was filtered and the substance MM4550 was eluted from the cellulose with 12 l. of 0.5 M potassium sulphate. The extract was concentrated to 6 l. in a climbing film evaporator under vacuum and below 30°C. Much of the potassium sulphate was precipitated by the addition of 12 l. of acetone. The solution was filtered and concentrated to 200 ml. by evaporation under vacuum below 30°C. The concentrate was loaded on to a 76mm. × 2m. column of "Amberlite XAD-2" resin, eluted with deionised water and the eluate was collected in 140 ml. fractions. Active fractions, as detected by the agar diffusion assay were bulked (2.2 l.) and concentrated to 275 ml. by ultra-filtration using an Amicon UM-05 membrane (150 mm. diameter) under nitrogen pressure of 60 p.s.i.

The concentrate was freeze-dried to yield 2.2g. of brown powder. 1 g. of the powder (32 activity units/mg.) was dissolved in 1 l. of 0.2 M sodium sulphate, and mixed with 1 l. of 2% w/v tetra-n-butyl-ammonium hydrogen sulphate in dichloromethane. The dichloromethane phase was separated by gravity and concentrated to 20 ml. Then 400 ml. of 40°–60°C petroleum spirit was added and the precipitate was collected by centrifugation. The precipitate was redissolved in dichloromethane (10 ml.) and extracted with 10 ml. water containing 80 mg. barium iodide and 70 mg. barium carbonate. The phases were separated, the aqueous phase was filtered and adjusted to pH 6.5. The solution was freeze-dried to yield a yellow powder. The solid was washed with acetone to dissolve out excess barium iodide and the pale yellow solid recovered by centrifugation and dried in vacuo. Yield 13 mg. at 320 activity units/mg.

EXAMPLE 7 a. A mixture of 125 mg. ampicillin trihydrate and 125 mg. substance MM 4550 was filled into gelatin capsule for oral use.
b. Similar mixtures to those described in (a) were made with phenethicillin and propicillin.
c. A mixture of 250 mg. of the sodium salt of ampicillin and 125 mg. substance MM 4550 was filled into a vial under sterile conditions and the vial was sealed. In use sterile water for injection was added to give a preparation for parenteral administration.

We claim:
1. A process for preparing the substance MM 4550 which process comprises aerobically cultivating a substance MM 4550-producing strain of *Streptomyces Olivaceus* ATCC 21379, 21380, 21381 or 21382 in a nutrient medium containing assimilable sources of carbon, nitrogen and mineral salts at a temperature of 20° to 35°C for a period of 1–7 days, separating the solid and liquid components of the broth, concentrating the liquid component and isolating the substance MM 4550 from the concentrate.

2. A process according to claim 1 in which the aerobic cultivation is carried out at a temperature of 30°–31°C for about 2 days.

3. A substance MM 4550 obtained by the process of claim 1 and produced from a strain of *Streptomyces Olivaceus* ATCC 21379, 21380, 21381 or 21382, which substance has the following characteristics:
   i. It is capable of inhibiting in vitro the β-lactamases produced by strains of *Escherichia coli, Klebsiella aerogenes, Proteus vulgaris* and *Bacillus cereus*,
   ii. it is not a general enzyme poison,
   iii. it synergises in vitro the activity of ampicillin against strains of *Klebsiella aerogenes, Proteus mirabilis* and *Staphylococcus aureus*,
   iv. it synergises in vitro the activity of cephaloridine against strains of *Klebsiella aerogenes, Escherichia coli* and *Proteus vulgaris*,
   v. it is able to pass through a dialysis membrane,
   vi. on electrophoresis it migrates towards the anode when in pyridine-acetic acid buffer at pH 5.3,
   vii. it is an acidic solid capable of forming a barium salt,
   viii. it forms a blue color when sprayed with Ehrlich's reagent,
   ix. it renders β-lactamase-producing strains of *Klebsiella aerogenes* susceptible to benzylpenicillin,
   x. in the form of its barium salt it has the infrared absorption spectrum shown in the accompanying drawing.

* * * * *